United States Patent
Sudo

(10) Patent No.: US 9,460,743 B1
(45) Date of Patent: Oct. 4, 2016

(54) SERVO WRITING METHOD, MAGNETIC DISK APPARATUS AND HEAD POSITION CONTROL METHOD

(71) Applicant: Kabushiki Kaisha Toshiba, Minato-ku, Tokyo (JP)

(72) Inventor: Daisuke Sudo, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/844,790

(22) Filed: Sep. 3, 2015

Related U.S. Application Data

(60) Provisional application No. 62/171,440, filed on Jun. 5, 2015.

(51) Int. Cl.
G11B 5/58 (2006.01)
G11B 5/596 (2006.01)

(52) U.S. Cl.
CPC ....... *G11B 5/59627* (2013.01); *G11B 5/59666* (2013.01)

(58) Field of Classification Search
None
See application file for complete search history.

(56) References Cited

U.S. PATENT DOCUMENTS

| | | | |
|---|---|---|---|
| 3,597,750 A * | 8/1971 | Brunner | G01P 3/50 360/77.02 |
| 6,128,153 A | 10/2000 | Hasegawa et al. | |
| 6,496,322 B1 | 12/2002 | Hasegawa et al. | |
| 6,865,051 B2 * | 3/2005 | Takaishi | G11B 5/556 360/63 |
| 7,119,981 B2 | 10/2006 | Hanson et al. | |

FOREIGN PATENT DOCUMENTS

| | | | |
|---|---|---|---|
| JP | 06-150591 A | 5/1994 |
| JP | 09-330571 A | 12/1997 |
| JP | 2965062 B2 | 10/1999 |
| JP | 3297938 B2 | 7/2002 |
| JP | 2003-022633 A | 1/2003 |

* cited by examiner

*Primary Examiner* — K. Wong
(74) *Attorney, Agent, or Firm* — White & Case LLP

(57) ABSTRACT

According to one embodiment, a servo writing method for a magnetic disk apparatus that includes a magnetic disk and a head is provided. The method rotates the magnetic disk, derives a path obtained by adding a second specifying value to a first specifying value, the first specifying value corresponding to a separation distance from a rotation center of the magnetic disk, the second specifying value periodically displacing the separation distance in a radial direction synchronously with a rotation angle of the magnetic disk, the second specifying value being a value in which the separation distances at a start point and an end point of one rotation of the magnetic disk coincide, and, while causing the head to follow the path, writes servo information onto the magnetic disk with the head.

15 Claims, 8 Drawing Sheets

SERVO WRITING METHOD, MAGNETIC DISK APPARATUS AND HEAD POSITION CONTROL METHOD

CROSS-REFERENCE TO RELATED APPLICATIONS

This application is based upon and claims the benefit of priority from U.S. Provisional Application No. 62/171,440, filed on Jun. 5, 2015; the entire contents of which are incorporated herein by reference.

FIELD

Embodiments described herein relate generally to a servo writing method, a magnetic disk apparatus and a head position control method.

BACKGROUND

In magnetic disk apparatuses such as hard disks, servo patterns are written as servo information indicating information about positions on a magnetic disk. In the magnetic disk apparatus, by reading servo information from these servo patterns, a magnetic head can be moved to a target track.

The process of writing servo patterns onto the magnetic disk is called servo writing and is generally executed in the production process for magnetic disk apparatuses. In the conventional art, servo patterns are written at predetermined intervals (track pitches) to form tracks shaped like concentric circles or a spiral-shaped track with respect to the rotation center of the magnetic disk.

However, the track pitch of servo patterns may vary due to the influence of disturbance experienced during servo writing. If variation of the track pitch is large, servo gain varies, so that accuracy in detecting the head position, that is, accuracy in positioning the head decreases, and thus a malfunction such as a read error is likely to occur. Accordingly, a technique for reducing the influence of variation in the track pitch is desired.

DETAILED DESCRIPTION

In general, according to one embodiment, a servo writing method for a magnetic disk apparatus which comprises a magnetic disk and a head is provided. The servo writing method rotates the magnetic disk. The method derives a path obtained by adding a second specifying value to a first specifying value, the first specifying value corresponding to a separation distance from a rotation center of the magnetic disk, the second specifying value periodically displacing the separation distance in a radial direction synchronously with a rotation angle of the magnetic disk, the second specifying value being a value in which the separation distances at a start point and an end point of one rotation of the magnetic disk coincide. And, while causing the head to follow the path, the method writes servo information onto the magnetic disk with the head.

The servo writing method, magnetic disk apparatus, and head position control method according to an embodiment will be described in detail below with reference to the accompanying drawings. The present invention is not limited to this embodiment.

Figure 1:
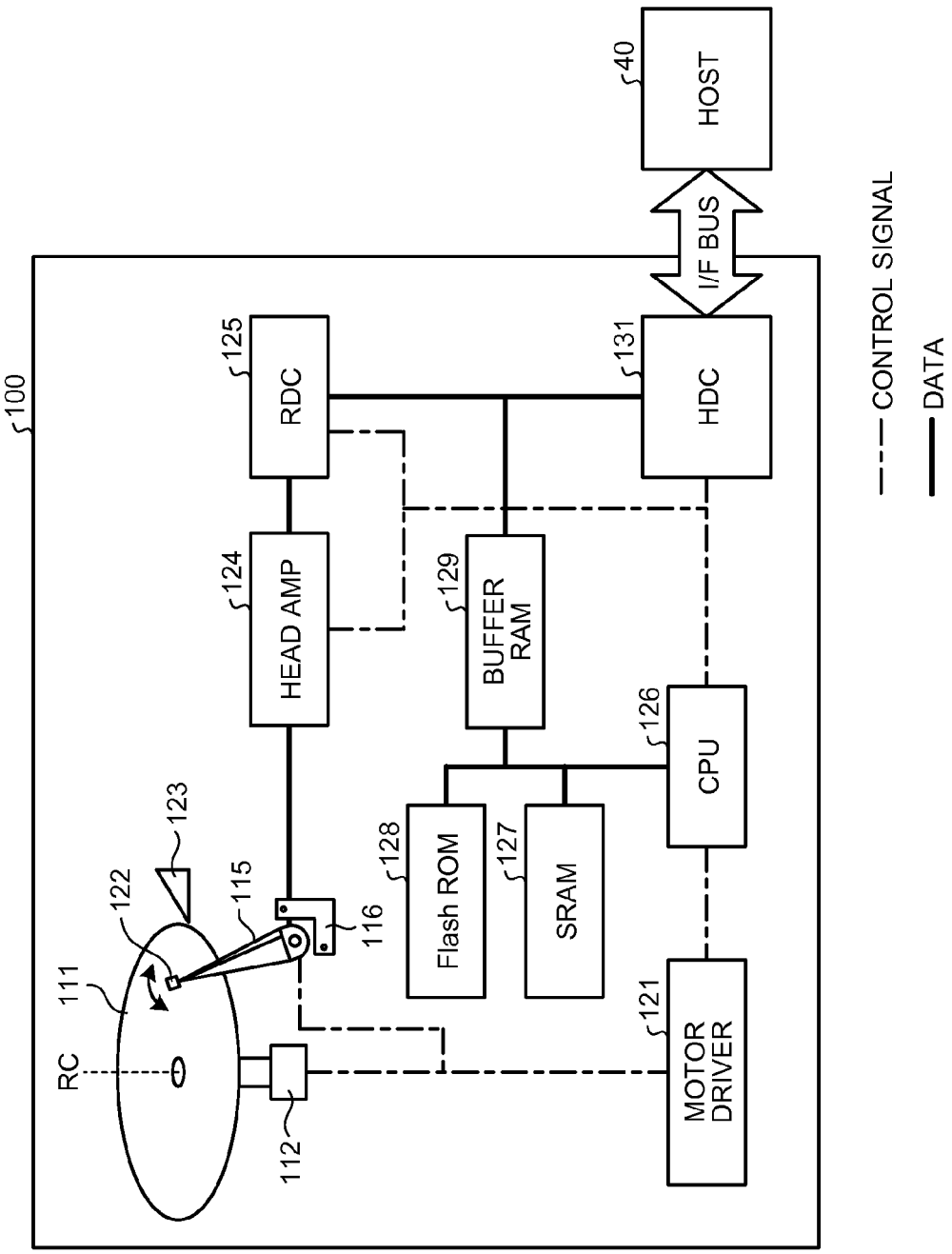
FIG. 1 is a block diagram showing an example of the hardware configuration which a magnetic disk apparatus of an embodiment has.

FIG. 1 is a block diagram showing an example of the hardware configuration which a magnetic disk apparatus 100 of the present embodiment has. A magnetic disk 111 is a disk-shaped recording medium, and one or a plurality of magnetic disks 111 are provided along an axial direction of the rotation axis. The magnetic disk 111 is rotated by a spindle motor (SPM) 112 with the rotation axis (rotation center RC) as the center at predetermined rotation speed. Note that the SPM 112 is driven by a motor driver 121.

A magnetic head 122 is provided at tip portion of an actuator arm 115. The magnetic head 122 is moved by a voice coil motor (VCM) 116 driven by the motor driver 121 in radial directions of the magnetic disk 111. While the rotation of the magnetic disk 111 is stopped, the magnetic head 122 is evacuated onto a ramp 123. Note that the number of magnetic heads 122 (actuator arms 115) is not limited to any number, but that a corresponding number of magnetic heads to the number of magnetic disks 111 are provided.

The magnetic head 122 has a write head and a read head (not shown). The write head writes data onto the magnetic disk 111. The read head reads data from the magnetic disk 111.

A head amplifier 124 amplifies the signal read by the magnetic head 122 from the magnetic disk 111 to supply to a RDC (Read Write Channel) 125. Further, the head amplifier 124 amplifies a signal supplied from the RDC 125 to write data onto the magnetic disk 111 and supplies to the magnetic head 122.

The RDC 125 code modulates data to be written onto the magnetic disk 111 supplied from an HDC 131 described later to supply to the head amplifier 124. Further, the RDC 125 code demodulates a signal supplied from the head amplifier 124 into digital data to output to the HDC 131.

A CPU (Central Processing Unit) 126 is a processor of the magnetic disk apparatus 100. An SRAM (Static Random Access Memory) 127 that is a for-operation memory, a flash ROM (Read Only Memory) 128 that is a nonvolatile memory, and a for-temporary-storage buffer RAM 129 are connected to the CPU 126.

The flash ROM 128 stores various programs (firmware, etc.) related to the operation of the magnetic disk apparatus 100. Further, the flash ROM 128 stores a variety of setting information related to the operation of the magnetic disk apparatus 100. For example, the flash ROM 128 stores a table in which first specifying values $U_{r1}$ are associated with second specifying values $U_{r2}$ as setting information. Here, the first specifying value $U_{r1}$ is data specifying the radial position of a track (a track number or cylinder number). The radial position is the distance measured in a radial direction from the rotation center RC of the magnetic disk 111 to the track. An equal number of first specifying values $U_{r1}$ to the number of tracks or cylinders written on the magnetic disk 111 are prepared. A second specifying value $U_{r2}$ is prepared for each first specifying value $U_{r1}$. An equal number of second specifying values $U_{r2}$ to the number of tracks written on the magnetic disk 111 may be prepared, or a second specifying value $U_{r2}$ may be prepared for each of the zones partitioned along the radius. Further, second specifying values $U_{r2}$ may be prepared for each magnetic head 122 or cylinder, or may be common to, not depending on, the magnetic heads 122 or cylinders. The details of the second specifying value $U_{r2}$ will be described later.

The HDC (Hard Disk Controller) 131 provides the CPU 126 with access to/from function units such as the RDC 125. Further, the HDC 131 provides the CPU 126 with access to/from a host computer (host) 40. For example, the HDC 131 performs control of transmission/reception of data to/from the host computer (host) 40 via an I/F bus and control of the buffer RAM 129. The buffer RAM 129 is used as a cache for data which is to be transmitted to or has been received from the host 40.

The CPU 126 controls the operation of the magnetic disk apparatus 100 comprehensively by cooperating with a program stored in the flash ROM 128. For example, the magnetic disk apparatus 100 performs servo writing to write servo information onto the magnetic disk 111 under the control of the CPU 126. The servo information includes a variety of information used to detect the position of the magnetic head 122 (hereinafter called a head position) in a radial direction over the magnetic disk 111. The servo information includes, e.g., servo marks, cylinder numbers, track numbers, sector numbers, a burst signal, and so on.

Further, the magnetic disk apparatus 100 performs head-position control to position the magnetic head 122 in a target position based on servo information written on the magnetic disk 111 and traversing velocity $V_S$ described later under the control of the CPU 126.

In the conventional art, servo writing at a predetermined track interval (SvTP: Servo track pitch) is performed to form concentric circle-shaped tracks with respect to the rotation center RC of the magnetic disk 111. However, the SvTP may vary due to the influence of disturbance experienced at the time of servo writing. As an example of this disturbance, low-frequency noise lower than the rotation frequency of the SPM 112 can be cited. If variation in the SvTP is large, servo gain varies (oscillates), so that accuracy in detecting the head position decreases, and thus a malfunction such as a read error is likely to occur.

Accordingly, the magnetic disk apparatus 100 of the present embodiment performs processing to reduce the influence of variation in the SvTP when performing servo writing and head-position control. Specifically, the magnetic disk apparatus 100 performs servo writing with following servo tracks formed by adding sinusoidal waves or triangular waves to concentric circle-shaped tracks with respect to the rotation center RC. Further, when performing writing or reading data or so on for the magnetic disk 111, the magnetic disk apparatus 100 controls the head position to describe concentric circles with respect to the rotation center RC. The control system of the magnetic disk apparatus 100 will be described below.

Figure 2:
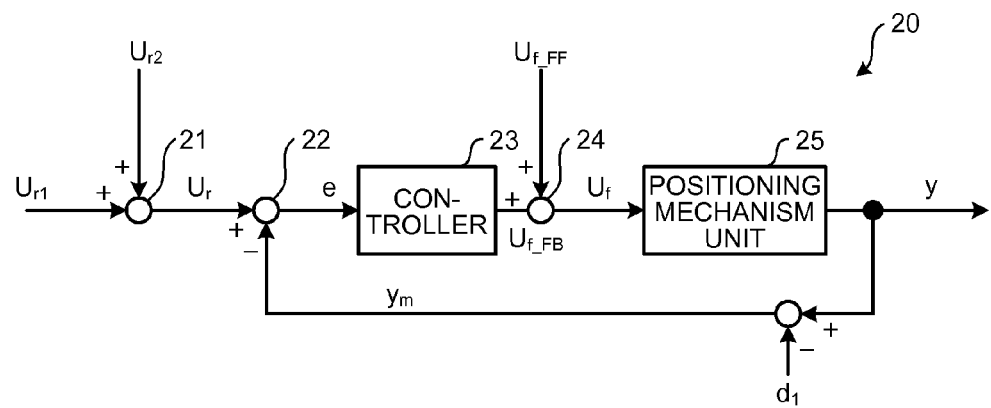
FIG. 2 is a block diagram showing an example configuration of a servo-write control unit that the magnetic disk apparatus of the embodiment comprises.

First, a control system related to servo writing (a servo-write control unit 20) that the magnetic disk apparatus 100 comprises will be described. FIG. 2 is a block diagram showing an example configuration of the servo-write control unit 20 that the magnetic disk apparatus 100 comprises.

As shown in FIG. 2, the servo-write control unit 20 comprises a first adder 21, a subtractor 22, a controller 23, a second adder 24, and a positioning mechanism unit 25. Note that part or all of the servo-write control unit 20 may be constituted by software, which is implemented by the CPU 126 and a program cooperating. Or part or all of the servo-write control unit 20 may be constituted by hardware, which is implemented by a dedicated processor. Or part or all of the servo-write control unit 20 may be implemented by other function units such as the motor driver 121 and the HDC 131.

The CPU 126 sequentially reads the first specifying value $U_{r1}$ and the second specifying value $U_{r2}$ of each track from the table in the flash ROM 128 and inputs to the first adder 21. The first specifying value $U_{r1}$ specifies a fixed radial position on the magnetic disk 111. The second specifying value $U_{r2}$ specifies a varying value by which to displace the first specifying value $U_{r1}$ continuously through one rotation along the circular track with the rotation center RC as the center and with the radial position specified by the first specifying value $U_{r1}$ as the radius.

As an example of the second specifying value $U_{r2}$, a sinusoidal wave $U_{r2\_sin}$ expressed by the following equation (1) can be used. Here, A is an amplitude; $\theta$ is the rotation angle of the SPM 112; and $\theta_{ofs}$ is an arbitrary offset from the rotation angle $\theta$.

$$U_{r2\_sin} = A \sin(\theta + \theta_{ofs}) \quad (1)$$

Or as another example of the second specifying value $U_{r2}$, a triangular wave $U_{r2\_tri}$ expressed by the following equation (2) can be used.

$$U_{r2\_tri} = A \frac{8}{\pi^2} \sum_{k=1}^{\infty} \left\{ \sin\left(\frac{k\pi}{2}\right) \frac{\sin(k(\theta + \theta_{ofs}))}{k^2} \right\} \quad (2)$$

Here, the second specifying value $U_{r2}$ is adjusted so that the radial positions at the start point and the end point of the circular track specified by the first specifying value $U_{r1}$ coincide. More specifically, the period or wavelength of the sinusoidal wave $U_{r2\_sin}$ or the triangular wave $U_{r2\_tri}$ is adjusted so that one rotation of the circular track specified by the first specifying value $U_{r1}$ coincides with n periods thereof, where n is ½ or an integer of one or greater. The amplitude A is set at a value greater than the SvTP (e.g., 15 times the SvTP). Where the triangular wave $U_{r2\_tri}$ is used, the upper limit of the order k, that is, the number of sinusoidal components in the composite is not limited to any number. For example, the second specifying value $U_{r2}$ may be a low-order component of the triangular wave $U_{r2\_tri}$ composed of the first order to the fifth order (k=1 to 5).

Figure 3:
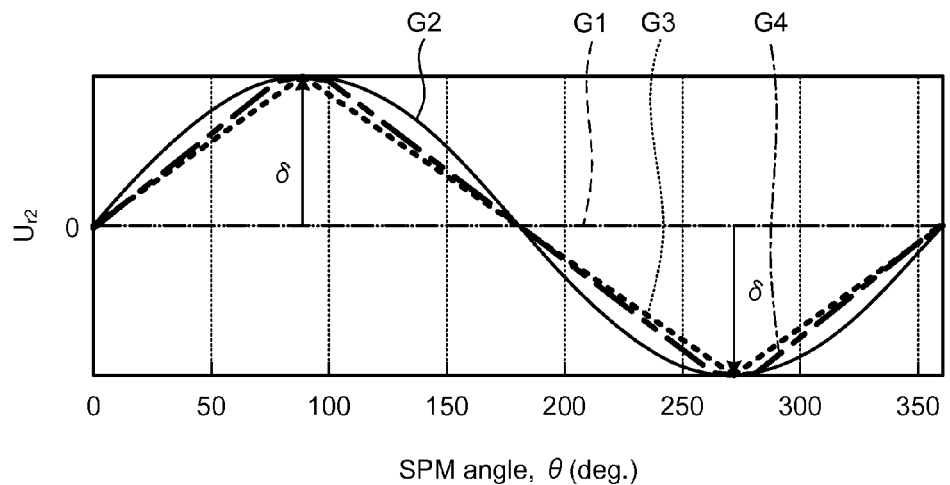
FIG. 3 is a diagram showing examples of a second specifying value $U_{r2}$ according to the embodiment.

FIG. 3 is a diagram showing examples of the second specifying value $U_{r2}$. The horizontal axis represents the rotation angle $\theta$ of the SPM 112. The vertical axis represents the value (amplitude $\delta$) of the second specifying value $U_{r2}$ with the first specifying value $U_{r1}$ as a reference value (0).

The graph G1 denotes the case where the second specifying value $U_{r2}$ is zero, that is, the circular track specified by the first specifying value $U_{r1}$. The graph G2 denotes the track in the case where the sinusoidal wave $U_{r2\_sin}$ is used as the second specifying value $U_{r2}$. The graph G3 denotes the track in the case where the triangular wave $U_{r2\_tri}$ is used as the second specifying value $U_{r2}$.

As shown in FIG. 3, the second specifying value $U_{r2}$ displaces the radial position specified by the first specifying value $U_{r1}$ periodically (continuously) synchronously with the rotation angle θ. Where a low-order component of the triangular wave $U_{r2\_tri}$ is used as the second specifying value $U_{r2}$, the track is in a shape as denoted by the graph G4.

The track of the graph G4 is in a shape asymptotic to the graph G2 as compared with the graph G3. Although FIG. 3 shows an example where one rotation of the circular track specified by the first specifying value $U_{r1}$ is one period of the second specifying value $U_{r2}$, the invention is not limited to this. For example, the period of the second specifying value $U_{r2}$ may be set at ½ or an integer of one or greater as mentioned above.

In the present embodiment, the table in the flash ROM 128 holds one rotation worth of position correction information representing the above-described sinusoidal wave $U_{r2\_sin}$ or triangular wave $U_{r2\_tri}$ as the second specifying value $U_{r2}$. For example, if a cylinder (track) of the magnetic disk 111 has 400 sectors, the second specifying value $U_{r2}$ holds 400 of position correction information corresponding to the sectors for that cylinder.

Referring back to FIG. 2, the first adder 21 adds the second specifying value $U_{r2}$ to the first specifying value $U_{r1}$. The first adder 21 outputs the result of adding the first specifying value $U_{r1}$ and the second specifying value $U_{r2}$ as a target position $U_r$ to the subtractor 22. The subtractor 22 calculates the offset of an observed head position $y_m$ from the target position $U_r$ as a deviation e ($=U_r-y_m$).

The controller 23 generates a manipulation amount $U_{f\_FE}$ based on the deviation e. The second adder 24 adds an FF control amount $U_{f\_FF}$ to the manipulation amount $U_{r\_FB}$. The second adder 24 outputs the result of adding the manipulation amount $U_{f\_FB}$ and the FF control amount $U_{f\_FF}$ as a manipulation amount $U_f$ to the positioning mechanism unit 25.

Here, the FF control amount $U_{f\_FF}$ is a feedback control amount (manipulation amount) for suppressing the influence of disturbance $d_1$ applied at the time of servo writing. The FF control amount $U_{f\_FF}$ can be obtained through learning repetitive control or the like. In the present embodiment, for example, the CPU 126 determines the FF control amount $U_{f\_FF}$ to be inputted to the second adder 24 based on the detecting result of a sensor (not shown) that detects a signal correlated with disturbance $d_1$. Then the second adder 24 adds the FF control amount $U_{f\_FF}$ to the manipulation amount $U_{f\_FB}$ to output the manipulation amount $U_f$ with which accuracy in following the second specifying value $U_{r2}$ is heightened.

The positioning mechanism unit 25 drives the VCM 116 according to the manipulation amount $U_f$ given from the second adder 24. That is, the positioning mechanism unit 25 moves the actuator arm 115 in a radial direction of the magnetic disk 111. Thus, the magnetic head 122 is positioned in an actual head position y.

The servo-write control unit 20 detects the head position of the magnetic head 122 based on servo information and the like written on the magnetic disk 111 under the control of the CPU 126. Here, the head position actually detected is the observed head position $y_m$ that is disturbance $d_1$ at servo writing added to the actual head position y. The method of detecting the observed head position $y_m$ at servo writing is a publicly known technique, and hence description thereof is omitted.

Then the servo-write control unit 20, with the FF control amount $U_{f\_FF}$ and the observed head position $y_m$ being inputted thereto, repeats the operation of writing new servo tracks at predetermined track pitches (SvTPs). Thus, multiple tracks worth of servo information is written as servo tracks onto the magnetic disk 111. The magnetic disk apparatus 100 may be configured such that the CPU 126 inputs the FF control amount $U_{f\_FF}$ and the observed head position $y_m$ or that another function unit (e.g., the HDC 131) inputs them.

Figure 4:
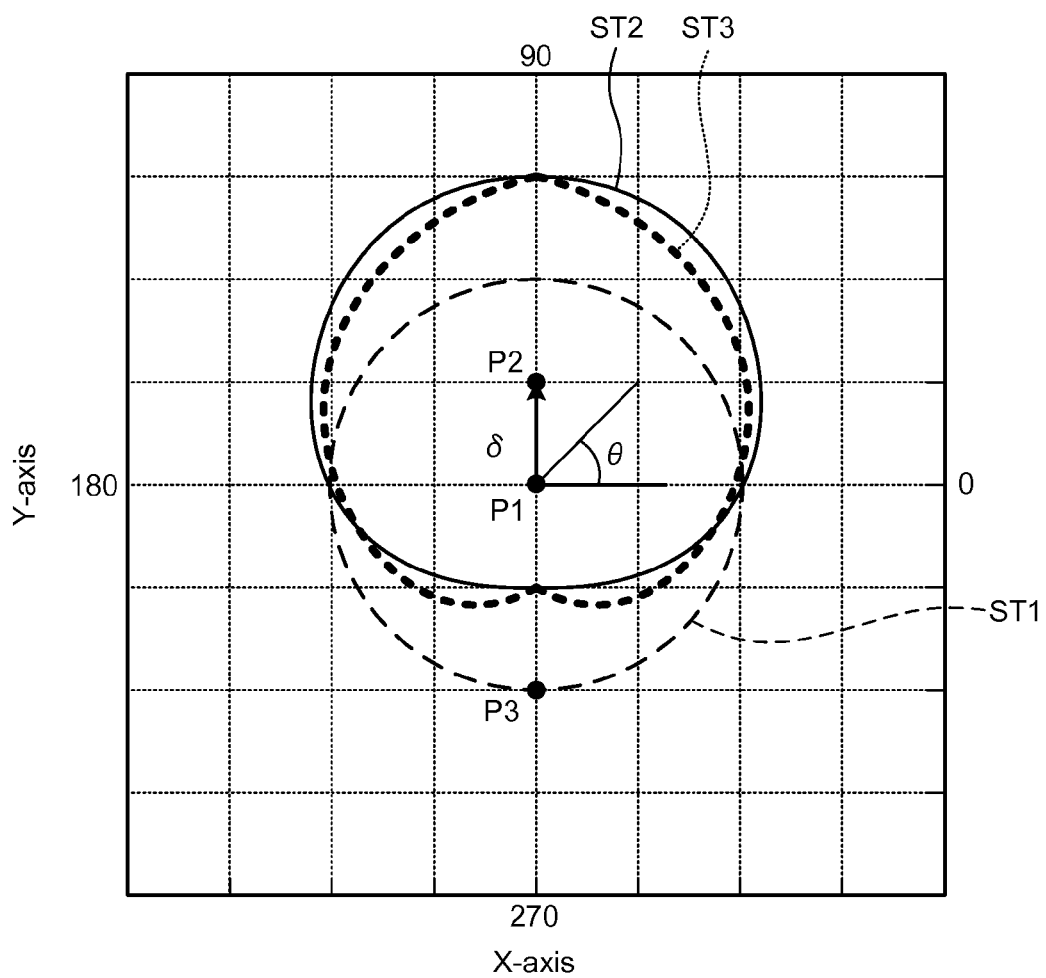
FIG. 4 is a diagram for explaining servo tracks written on a magnetic disk of the embodiment.

FIG. 4 is a diagram for explaining servo tracks written on the magnetic disk 111. The plane formed by an X axis and a Y axis corresponds to a disk surface of the magnetic disk 111. Further, the point P1 in the middle of this plane corresponds to the rotation center RC of the SPM 112 (the magnetic disk 111). Yet further, angles 0, 90, 180, and 270 plotted on the X axis and Y axis correspond to the rotation angle θ of the SPM 112. Note that FIG. 4 shows a servo track written for a certain first specifying value $U_{r1}$.

The servo track ST1 denotes a servo pattern in the case where the second specifying value $U_{r2}$ is zero, that is, where only the first specifying value $U_{r1}$ is used. As shown in FIG. 4, the path formed by the servo track ST1 is in a circular shape (concentric circle) with the point P1 as the center. The servo track ST2 denotes a path in the case where the second specifying value $U_{r2}$ is the sinusoidal wave $U_{r2\_sin}$. The servo track ST3 denotes a path in the case where the second specifying value $U_{r2}$ is the triangular wave $U_{r2\_tri}$. Note that FIG. 4 shows examples where one period of the second specifying value $U_{r2}$ is one rotation of the circular path specified by the first specifying value $U_{r1}$.

As shown in FIG. 4, the paths formed by the servo tracks ST2, ST3 are shaped in closed curves obtained by displacing each radial position on the servo track ST1 by the amplitude δ according to the rotation angle θ. For example, the path formed by the servo track ST2 is in a circular shape with the point P2 offset by the amplitude δ from the point P1 at an angle of 90 degrees, where the amplitude δ is maximal (δ=A), as the center. The path formed by the servo track ST3 is generally in a heart shape with the point P2 as the center as in the servo track ST2 and with its tip being at the position of an angle of 90 degrees, where the amplitude δ is maximal (δ=A).

As such, the servo-write control unit 20 performs servo writing based on the target position $U_r$ obtained by adding the second specifying value $U_{r2}$ specifying the sinusoidal wave $U_{r2\_sin}$ or triangular wave $U_{r2\_tri}$ to the first specifying value $U_{r1}$ specifying one of concentric circle-shaped tracks. Thus, servo tracks written on the magnetic disk 111 form non-concentric circle-shaped paths, whose distances (radial positions) from the rotation center RC vary continuously through one rotation.

Next, the operation at the time of servo writing will be described with reference to FIGS. 5 and 6. The servo writing can be divided into a servo write process of writing servo information onto each cylinder (track) and a during-servo process that is performed while writing servo information. First, the servo write process will be described with reference to FIG. 5.

Figure 5:
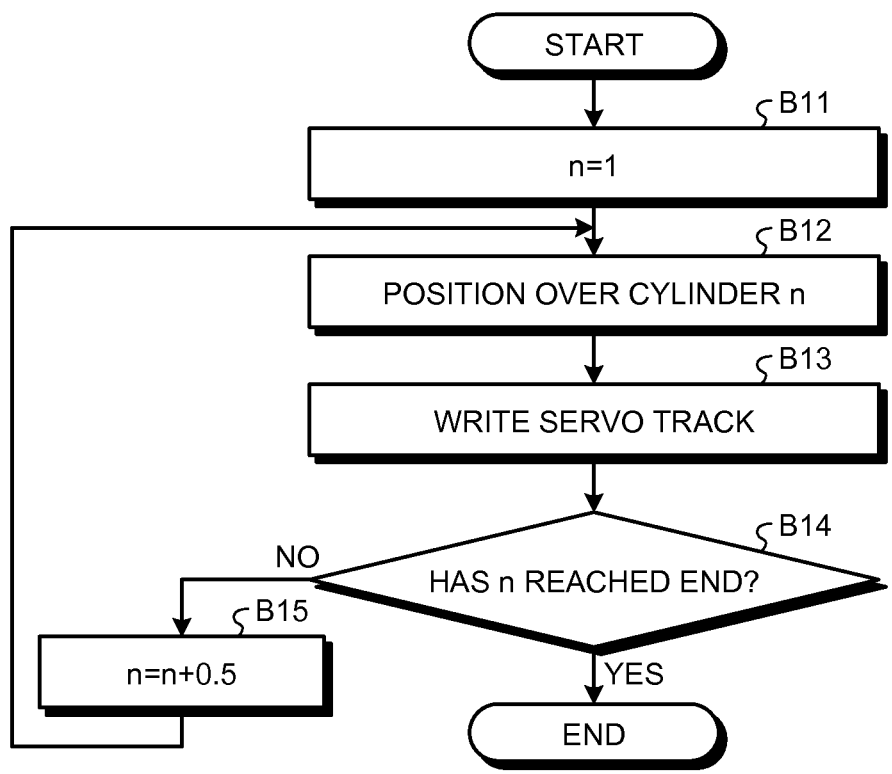
FIG. 5 is a flow chart showing an example procedure of a servo write process according to the embodiment.
Figure 6:
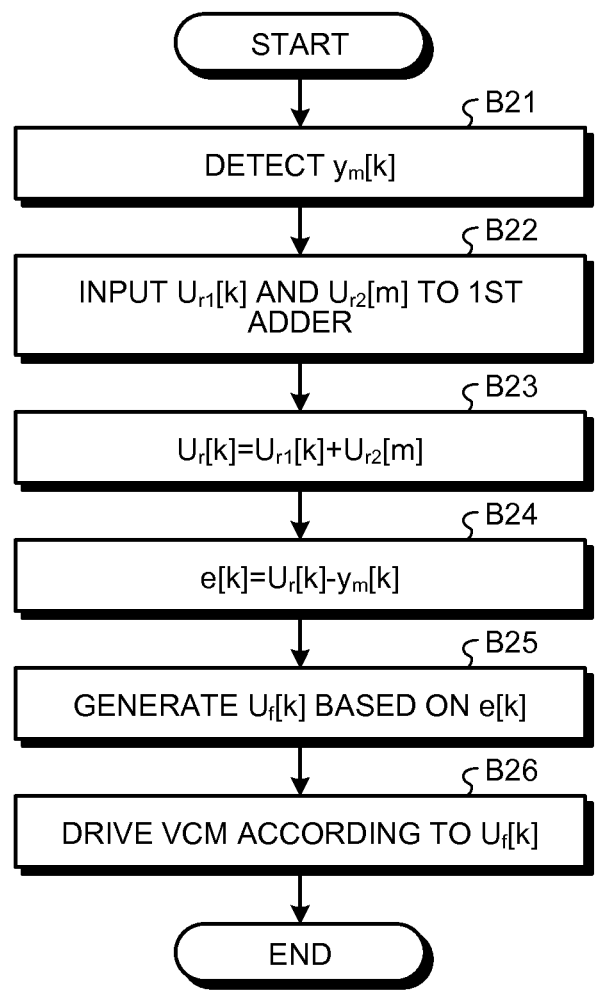
FIG. 6 is a flow chart showing an example procedure of a during-servo process according to the embodiment.

FIG. 5 is a flow chart showing an example procedure of the servo write process. Although this process describes an example where NULL-type servo information (servo pattern) is written, the type of the servo pattern is not limited to this.

For the NULL-type servo pattern, a burst pattern formed of an N phase and a Q phase is used. As the N phase and Q phase, magnetization patterns can be placed in which the polarity is inverted alternately at intervals of 180 degrees (=1 cylinder) when going along a radial direction of the magnetic disk 111. Further, the N phase and Q phase can be offset in phase from each other by 90 degrees (=0.5 cylinder) when going along a radial direction of the magnetic disk 111. For example, the N phase can be placed such that the polarity is inverted at the boundaries between adjacent tracks, and the Q phase can be placed such that the polarity is inverted at the center of each track.

The CPU 126 sets the cylinder number n to an initial value of 1, thereby setting the cylinder that is a first write position (B11). Then the CPU 126 positions the head position over the cylinder corresponding to the cylinder number n (B12).

Then the CPU 126 cooperates with the RDC 125 and the like to write a servo pattern (servo track) onto the magnetic disk 111 (B13). Note that while writing a servo track, the servo-write control unit 20 performs the during-servo process (see FIG. 6).

When finishing writing the servo pattern for the cylinder number n, the CPU 126 determines whether the cylinder number n has reached an end number (B14). If determining that the cylinder number n has not reached the end number (No at B14), the CPU 126 sets 0.5 (cylinder) added to the cylinder number n as a new cylinder number n (B15) and returns to B12. Note that the CPU 126 writes servo patterns whose phases are offset from each other by 90 degrees for a cylinder number whose first digit after decimal point is zero and a cylinder number whose first digit after decimal point is 5.

On the other hand, if determining that the cylinder number n has reached the end number at B14 (Yes at B14), the CPU 126 finishes this process.

Next, the during-servo process will be described with reference to FIG. 6. FIG. 6 is a flow chart showing an example procedure of the during-servo process. This process is executed while writing a servo pattern in the above-described servo write process.

First, the CPU 126 detects the observed head position $y_m[k]$ of the magnetic head 122 (B21). Then the CPU 126 inputs the first specifying value $U_{r1}[k]$ and the second specifying value $U_{r2}[m]$ to the first adder 21 (B22). Here, the first specifying value $U_{r1}[k]$ is the first specifying value $U_{r1}$ for sample number k that specifies the cylinder (track) detected at the observed head position $y_m[k]$. The second specifying value $U_{r2}[m]$ is data for the sector (of sector number m) to perform servo writing on from among second specifying values $U_{r2}$ registered in association with the first specifying value $U_{r1}[k]$. For example, if the cylinder has 400 sectors, 400 second specifying values $U_{r2}$ are sequentially inputted.

The first adder 21 adds the first specifying value $U_{r1}[k]$ and the second specifying value $U_{r2}[m]$ to calculate the target position $U_r[k]$ (B23). Then the subtractor 22 takes the difference between the target position $U_r[k]$ and the observed head position $y_m[k]$ to calculate the deviation $e[k]$ (B24). Then the controller 23 and the second adder 24 generates the manipulation amount $U_f[k]$ based on the deviation $e[k]$ (B25).

Then the positioning mechanism unit 25 drives the VCM 116 according to the manipulation amount $U_f[k]$, thereby moving the magnetic head 122 to the target position $U_r[k]$ (B26). The observed head position $y_m[k]$ of the magnetic head 122 moved by driving the VCM 116 is inputted recursively to the subtractor 22.

Figure 7:
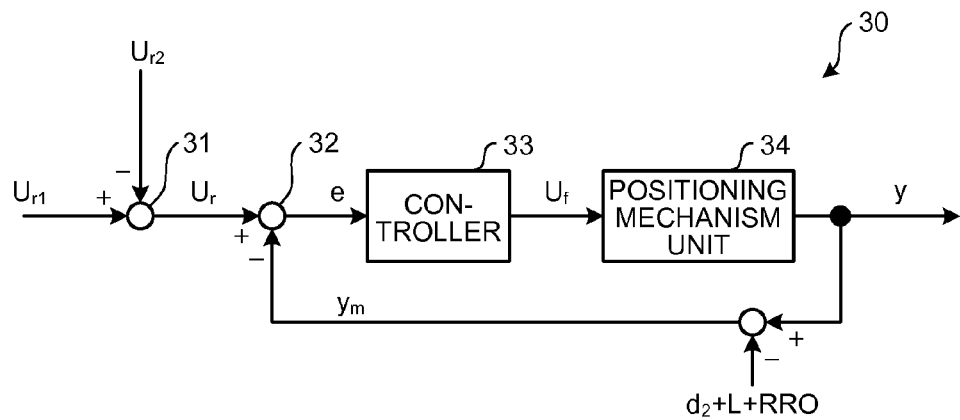
FIG. 7 is a block diagram showing an example configuration of a head position control unit that the magnetic disk apparatus of the embodiment comprises.

Next, a control system related to head-position control (a head position control unit 30) that the magnetic disk apparatus 100 comprises will be described. FIG. 7 is a block diagram showing an example configuration of the head position control unit 30 that the magnetic disk apparatus 100 comprises.

As shown in FIG. 7, the head position control unit 30 comprises a first subtractor 31, a second subtractor 32, a controller 33, and a positioning mechanism unit 34. Note that part or all of the head position control unit 30 may be constituted by software, which is implemented by the CPU 126 and a program cooperating. Or part or all of the head position control unit 30 may be constituted by hardware, which is implemented by a dedicated processor. Or part or all of the head position control unit 30 may be implemented by other function units such as the motor driver 121 and the HDC 131.

The CPU 126 inputs the first specifying value $U_{r1}$ for a track or sector on which to perform writing or reading data or so on and the second specifying value $U_{r2}$ corresponding to that the first specifying value $U_{r1}$ to the first subtractor 31. The first subtractor 31 subtracts the second specifying value $U_{r2}$ from the first specifying value $U_{r1}$ to output the subtracting result as the target position $U_r$ to the second subtractor 32. The second subtractor 32 calculates the difference between the target position $U_r$ and the observed head position $y_m$ as the deviation e ($=U_r-y_m$).

The controller 33 generates the manipulation amount $U_f$ to be given to the positioning mechanism unit 34 based on the deviation e. The positioning mechanism unit 34 drives the VCM 116 according to the manipulation amount $U_f$ given from the controller 33. Thus, the magnetic head 122 is positioned in the actual head position y.

The head position control unit 30 detects the head position of the magnetic head 122 based on servo information read by the magnetic head 122, the traversing velocity $V_S$ described later, and the like under the control of the CPU 126. Here, the head position actually detected is the observed head position $y_m$ that is a path L, RRO (Repeatable RunOut), and disturbance $d_2$ added to the actual head position y. The path L is the path formed by the servo track written on the magnetic disk 111 according to the second specifying value $U_{r2}$ in the servo write process. The RRO is a component corresponding to disturbance $d_1$ in the servo writing. The disturbance $d_2$ is a disturbance component applied when controlling the head position.

The head position control unit 30 recursively performs operation of positioning the magnetic head 122 in the target position $U_r$ while detecting the observed head position $y_m$. The magnetic disk apparatus 100 may be configured such that the CPU 126 detects (inputs) the observed head position $y_m$ or that another function unit (e.g., the HDC 131) detects (inputs) it. The method of detecting the observed head position $y_m$ is a publicly known technique, and hence description thereof is omitted.

In the above-described configuration of the head position control unit 30, the second subtractor 32 subtracts the observed head position $y_m$ from the target position $U_r$. By this subtraction, the component of the second specifying value $U_{r2}$ in the target position $U_r$ cancels out the component of the path L (the second specifying value $U_{r2}$) written in the servo write process. Therefore, the deviation e calculated by the second subtractor 32 is one obtained by removing the component of the second specifying value $U_{r2}$ from the target position $U_r$. Thus, the actual head position y of the magnetic head 122 does not follow servo tracks but forms concentric circle-shaped paths with respect to the rotation center RC. Hence, the magnetic head 122 is substantially fixed over the track corresponding to the first specifying value $U_{r1}$ (the target position $U_r$), so that as the magnetic disk 111 rotates, the magnetic head 122 goes across servo tracks written on the magnetic disk 111.

For example, when the radial position P3 on the magnetic disk 111 shown in FIG. 4 is specified by the first specifying value $U_{r1}$ (the target position $U_r$), the head position control unit 30 positions the magnetic head 122 in this radial position P3. In this case, the path of the magnetic head 122 is circular (in a concentric-circle shape) with respect to the point P1 since the magnetic disk 111 rotates around the point P1 (the rotation center RC). Further, the magnetic head 122 is substantially fixed over the magnetic disk 111, so that as the magnetic disk 111 rotates, the magnetic head 122 goes across the servo track ST2 (or ST3). For example, in the situation shown in FIG. 4, the magnetic head 122 is located outside the servo track ST2, but when the magnetic disk 111 rotates through 90 degrees, the magnetic head 122 crosses the servo track ST2 to be located inside.

Figure 8:
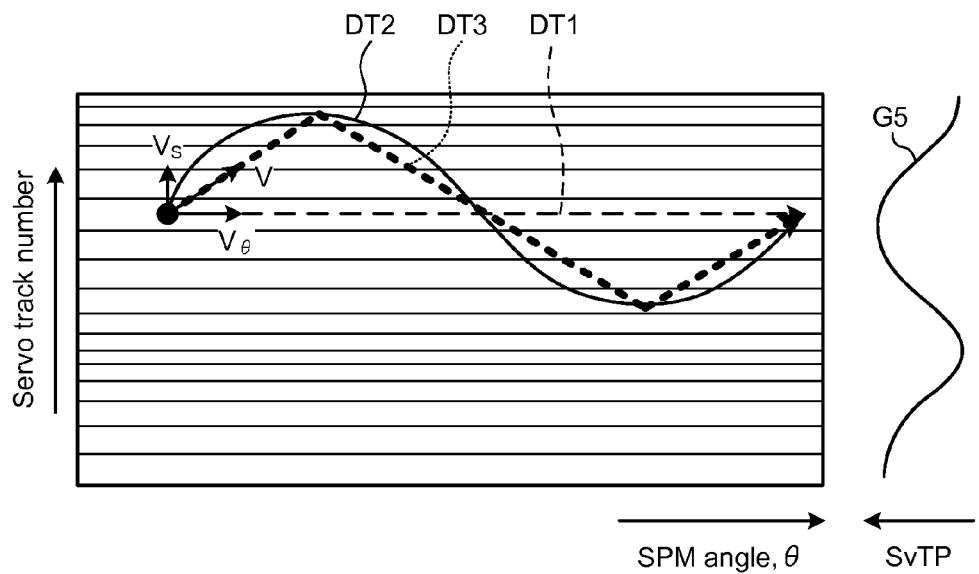
FIG. 8 is a diagram showing an example relation between servo tracks and data tracks according to the embodiment.

FIG. 8 is a diagram showing an example relation between servo tracks and data tracks. In FIG. 8, the horizontal axis represents the rotation angle θ of the SPM 112. The vertical axis represents the track number for servo tracks written on the magnetic disk 111. Note that in FIG. 8 the paths of servo tracks are indicated by straight lines.

A graph G5 on the right of FIG. 8 represents the state of the SvTP between servo tracks. In the graph G5, deviation to the left means that the SvTP becomes larger. Also with the servo writing method of the present embodiment, since being affected by the aforementioned disturbance $d_1$, the SvTP varies between servo tracks as shown by the graph G5.

For example, in the case where servo tracks are based on the sinusoidal wave $U_{r2\_sin}$, the head position control unit 30 controls the head position to follow the path of a data track DT2 to remove the component of this sinusoidal wave $U_{r2\_sin}$. In the case where servo tracks are based on the triangular wave $U_{r2\_tri}$, the head position control unit 30 controls the head position to follow the path of a data track DT3 to remove the component of this triangular wave $U_{r2\_tri}$. By this means, the paths of the data tracks DT2, DT3 are circular (in a concentric-circle shape) with respect to the rotation center RC. The data track DT1 is the path in the case of following the servo track.

As shown in FIG. 8, the velocity V of the magnetic head 122 relative to a servo track can be decomposed into two components, velocity $V_\theta$ in a circumferential direction and velocity (traverse velocity) $V_S$ in a radial direction. That is, the magnetic head 122 crosses servo tracks at traverse velocity V. Although FIG. 8 illustrates the velocity V for the data track DT3, the same applies to the data track DT2.

The head position control unit 30 detects the observed head position $y_m$ from servo information obtained by the magnetic head 122 crossing servo tracks, the traverse velocity $V_S$, and the like and recursively performs operation of positioning the magnetic head 122 in the target position $U_r$ based on the observed head position $y_m$. That is, the head position control unit 30 detects and adjusts the observed head position $y_m$ using multiple servo tracks which the magnetic head 122 has crossed.

As such, the magnetic disk apparatus 100 of the present embodiment detects and adjusts the head position using multiple servo tracks, thereby being able to reduce the influence of variation in the SvTP occurring between the servo tracks by an averaging effect. Thus, the magnetic disk apparatus 100 of the present embodiment can suppress variation in servo gain and improve accuracy in detecting the head position.

It is understood that as the traverse velocity $V_S$ becomes larger, an offset is more likely to occur in the observed head position $y_m$ detected. Hence, in order to reduce an offset of the demodulated position, it is preferable to decrease the maximum of the traverse velocity $V_S$.

Figure 9:
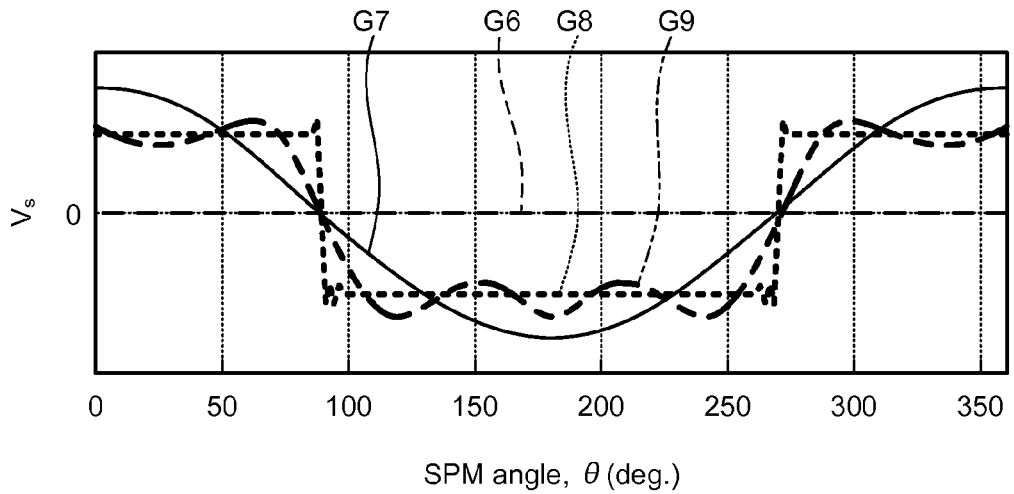
FIG. 9 is a diagram showing examples of traverse velocity $V_S$ according to the embodiment.

FIG. 9 is a diagram showing examples of the traverse velocity $V_S$. The horizontal axis represents the rotation angle θ of the SPM 112. The vertical axis represents the traverse velocity $V_S$. The graph G6 indicates the traverse velocity $V_S$ in the case where the second specifying value $U_{r2}$ is zero, that is, the head follows a servo track. The graph G7 indicates an example of the traverse velocity $V_S$ in the case where the sinusoidal wave $U_{r2\_sin}$ is used as the second specifying value $U_{r2}$. The graph G8 indicates an example of the traverse velocity $V_S$ in the case where the triangular wave $U_{r2\_tri}$ is used as the second specifying value $U_{r2}$. Note that the graphs G6 to G8 of FIG. 9 correspond to the graphs G1 to G3 illustrated in FIG. 3 respectively.

As shown in FIG. 9, the graphs G7, G8 have shapes corresponding to the waveforms of the sinusoidal wave $U_{r2\_sin}$ and the triangular wave $U_{r2\_tri}$ respectively. The graph G8 based on the triangular wave $U_{r2\_tri}$ is seen to be lower in the maximum of the traverse velocity $V_S$ when comparing the graphs G7, G8. Hence, by using the triangular wave $U_{r2\_tri}$ to write a servo track, an offset of the demodulated position can be reduced as compared with writing a servo track based on the sinusoidal wave $U_{r2\_sin}$.

The graph G9 indicates an example of the traverse velocity $V_S$ in the case where a low-order component of the triangular wave $U_{r2\_tri}$ is used as the second specifying value $U_{r2}$. Note that the graph G9 corresponds to the graph G4 illustrated in FIG. 3.

As shown in FIG. 9, the graph G9 varies more smoothly than the graph G8 and is closer in shape to the graph G7. It is understood that the maximum of the traverse velocity $V_S$ of the graph G9 is lower than the maximum of the graph G7. Therefore, by using a low-order component of the triangular wave $U_{r2\_tri}$ to write a servo track, the effect of reducing an offset of the demodulated position is reduced as compared with the case of using the triangular wave $U_{r2\_tri}$, but is improved as compared with the case of using the sinusoidal wave $U_{r2\_sin}$.

Figure 10:
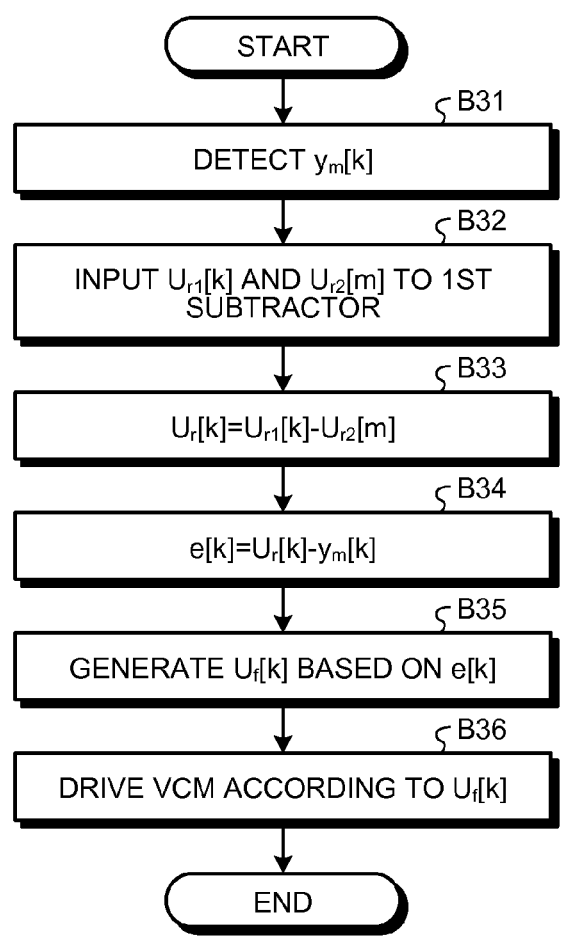
FIG. 10 is a flow chart showing an example procedure of a head position control process according to the embodiment.

FIG. 10 is a flow chart showing an example procedure of the head position control process executed by the head position control unit 30 shown in FIG. 7. This process is executed to perform reading or writing data or so on for a specific track or sector.

First, the CPU 126 detects the observed head position $y_m[k]$ of the magnetic head 122 (B31). Then the CPU 126 inputs the first specifying value $U_{r1}[k]$ and the second specifying value $U_{r2}[m]$ to the first subtractor 31 based on the observed head position $y_m[k]$ (B32). Here, the first specifying value $U_{r1}[k]$ is the first specifying value $U_{r1}$ for sample number k that specifies the cylinder (track) detected at the observed head position $y_m[k]$. The second specifying value $U_{r2}[m]$ is data for the sector (of sector number m) to perform servo writing on from among second specifying values $U_{r2}$ registered in association with the first specifying value $U_{r1}[k]$. For example, if the cylinder has 400 sectors, 400 second specifying values $U_{r2}$ are sequentially inputted.

Then the first subtractor 31 subtracts the second specifying value $U_{r2}[m]$ from the first specifying value $U_{r1}[k]$ to calculate the target position $U_r[k]$ (B33). Then the second subtractor 32 takes the difference between the target position $U_r[k]$ and the observed head position $y_m[k]$ to calculate the deviation $e[k]$ (B34). Then the controller 33 generates the manipulation amount $U_f[k]$ based on the deviation $e[k]$ (B35).

Then the positioning mechanism unit 34 drives the VCM 116 according to the manipulation amount $U_f[k]$, thereby moving the magnetic head 122 to the target position $U_r[k]$ (B36). The observed head position $y_m[k]$ of the magnetic head 122 moved by driving the VCM 116 is inputted recursively to the second subtractor 32.

Figure 11:
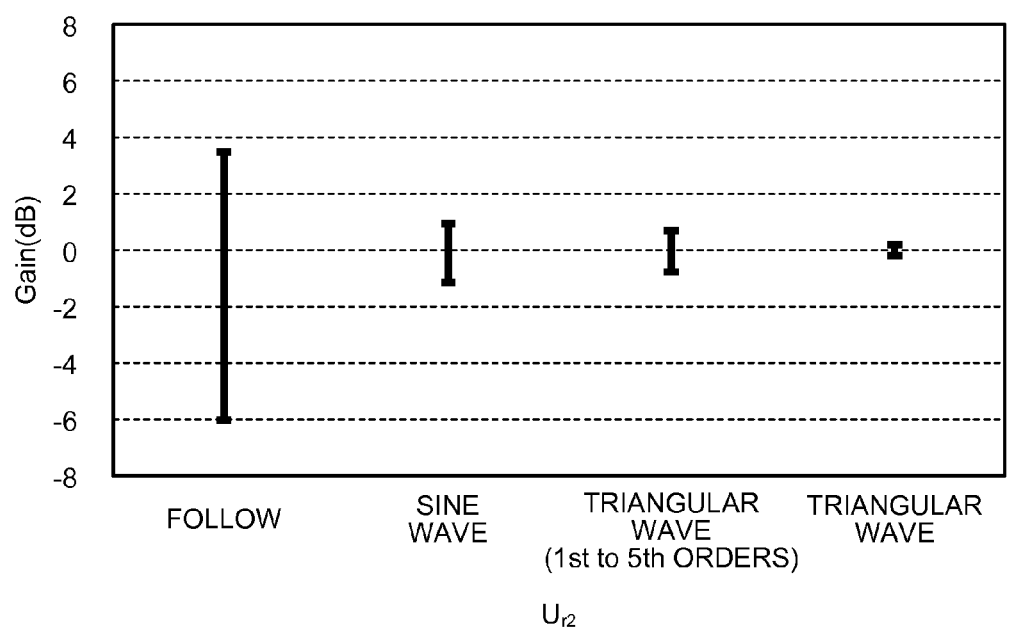
FIG. 11 is a diagram for explaining an effect of suppressing variation of the embodiment.

FIG. 11 is a diagram for explaining the effect of suppressing variation by the servo writing method and head position control method of the present embodiment. In FIG. 11, the horizontal axis represents the type of the second specifying value $U_{r2}$ that the first subtractor 31 subtracts from the first specifying value $U_{r1}$. Here, "FOLLOW" corresponds to the case of causing the head position to follow a servo track servo-written based on the sinusoidal wave $U_{r2\_sin}$. "SINE WAVE" corresponds to the case where the sinusoidal wave $U_{r2\_sin}$ is used as the second specifying value $U_{r2}$. "TRIANGULAR WAVE (1st to 5th ORDERS)" corresponds to the case where a low-order component of the triangular wave $U_{r2\_tri}$ is used as the second specifying value $U_{r2}$. "TRIANGULAR WAVE" corresponds to the case where the triangular wave $U_{r2\_tri}$ is used as the second specifying value $U_{r2}$.

The vertical axis of FIG. 11 represents the servo gain. The servo gains for the types were obtained through simulation under the following conditions.

Interval between servo tracks (SvTP): 63.5 nm
  Variation in SvTP: a sinusoidal wave of from 0.5 to 1.5 times
  Period of variation in SvTP: 10 SvTPs
  Number of sectors included in a servo track: 400
  First specifying value $U_{r1}$: 20 mm
  Amplitude A of the second specifying value $U_{r2}$: 1 μm As shown in FIG. 11, the range of variation in the servo gain when causing the head to follow a servo track is larger than in the case of using the sinusoidal wave $U_{r2\_sin}$ or the triangular wave $U_{r2\_tri}$. As such, when the servo writing method and head position control method of the present embodiment are used, variation in the servo gain associated with variation in SvTP can be suppressed. Further, because the maximum of the traverse velocity $V_S$ is lower when using the triangular wave $U_{r2\_tri}$ than when using the sinusoidal wave $U_{r2\_sin}$, variation in the servo gain associated with variation in SvTP can be more efficiently suppressed.

While an embodiment has been described, this embodiment has been presented by way of example only, and is not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

For example, in the above embodiment, the self-servo writing configuration where the magnetic disk apparatus 100 itself performs servo writing has been described, but the invention is not limited to this. Specifically, the magnetic disk apparatus 100 may be configured such that a magnetic disk 111 onto which servo tracks have been written by an external apparatus different from the magnetic disk apparatus 100 is incorporated therein. Where this configuration is adopted, the external apparatus may comprise the servo-write control unit 20 to perform servo writing according to the above servo writing method.

Although in the above embodiment the magnetic disk apparatus is configured such that the first specifying value $U_{r1}$ and the second specifying value $U_{r2}$ are stored in a table before servo writing, the invention is not limited to this. For example, it may be configured such that, while determining the first specifying value $U_{r1}$ and the second specifying value $U_{r2}$, it performs servo writing and stores the first specifying value $U_{r1}$ and the second specifying value $U_{r2}$ into a table.

Further, although in the above embodiment the magnetic disk apparatus is configured such that the second specifying value $U_{r2}$ corresponding to the first specifying value $U_{r1}$ is stored in a table, the invention is not limited to this. For example, it may be configured such that parameters (e.g., amplitude, phase, etc.) involved in creating the second specifying value $U_{r2}$ are stored in association with the first specifying value $U_{r1}$ in the flash ROM 128. In this case, the CPU 126 generates the second specifying value $U_{r2}$ using parameters in association with the first specifying value $U_{r1}$ and performs servo writing and head-position control based on the first specifying value $U_{r1}$ and the second specifying value $U_{r2}$. Where this configuration is adopted, the amount of information to be stored can be reduced as compared with the configuration where the second specifying value $U_{r2}$ is stored as it is.

Yet further, although in the above embodiment the magnetic disk apparatus is configured such that the first specifying value $U_{r1}$ and the second specifying value $U_{r2}$ are stored in the flash ROM 128, not being limited to this, it may be configured such that they are stored in another storage medium.

What is claimed is:

1. A servo writing method for a magnetic disk apparatus that comprises a magnetic disk and a head, the method comprising:
   rotating the magnetic disk;
   deriving a path shaped in a closed curve, the path shaped in the closed curve being a path that is offset from a concentric circle, the concentric circle having a rotation center of the magnetic disk as a center, the path shaped in the closed curve being obtained by adding a second specifying value to a first specifying value, the first specifying value corresponding to a separation distance from the rotation center of the magnetic disk, the second specifying value periodically displacing the separation distance in a radial direction synchronously with a rotation angle of the magnetic disk, the second specifying value being a value in which the separation distances at a start point and an end point of one rotation of the magnetic disk coincide; and,
   while causing the head to follow the path shaped in the closed curve, writing servo information onto the magnetic disk with the head.

2. The method according to claim 1, wherein the second specifying value specifies a sinusoidal wave.

3. The method according to claim 1, wherein the second specifying value specifies a triangular wave.

4. The method according to claim 1, wherein the second specifying value specifies a low-order component of a triangular wave.

5. The method according to claim 1, further comprising:
   sequentially inputting the respective first specifying values of a plurality of tracks of which the separation distances are different; and, while causing the head to follow the path shaped in the closed curve of each track, writing the servo information that corresponds to each track onto the magnetic disk.

6. A magnetic disk apparatus comprising:
a magnetic disk that rotates, the magnetic disk being a disk onto which servo information is written, the servo information being written onto a path shaped in a closed curve, the path shaped in the closed curve being a path that is offset from a concentric circle, the concentric circle having a rotation center of the magnetic disk as a center, the path shaped in the closed curve being obtained by adding a second specifying value to a first specifying value, the first specifying value corresponding to a separation distance from the rotation center of the magnetic disk, the second specifying value periodically displacing the separation distance in a radial direction synchronously with a rotation angle of the magnetic disk, the second specifying value being a value in which the separation distances at a start point and an end point of one rotation of the magnetic disk coincide;
a head; and
a controller that:
calculates a target position obtained by subtracting the second specifying value from the first specifying value, the first specifying value specifying a radial position of a specific track over the magnetic disk, the second specifying value displacing a concentric circle-shaped path to the path shaped in the closed curve, the concentric circle-shaped path having the separation distance as a radius, the separation distance being a distance between the first specifying value and the rotation center,
detects, based on the servo information read from the magnetic disk with the head, the radial position of the head over the magnetic disk, and
positions the head to the calculated target position.

7. The apparatus according to claim 6, wherein the second specifying value specifies a sinusoidal wave.

8. The apparatus according to claim 6, wherein the second specifying value specifies a triangular wave.

9. The apparatus according to claim 6, wherein the second specifying value specifies a low-order component of a triangular wave.

10. The apparatus according to claim 6,
a storing unit that stores the first specifying value and the second specifying value that are associated with each other, or that stores the first specifying value and a parameter involved in creating the second specifying value that are associated with each other,
wherein the controller calculates the target position based on the first specifying value and the second specifying value, or based on the first specifying value and a parameter in association with the first specifying value stored in the storing unit.

11. A head position control method for a magnetic disk apparatus that comprises a magnetic disk that rotates and a head, the magnetic disk being a disk onto which servo information is written, the method comprising:
writing the servo information onto a path shaped in a closed curve, the path shaped in the closed curve being a path that is offset from a concentric circle, the concentric circle having a rotation center of the magnetic disk as a center, the path shaped in the closed curve being obtained by adding a second specifying value to a first specifying value, the first specifying value corresponding to a separation distance from the rotation center of the magnetic disk, the second specifying value periodically displacing the separation distance in a radial direction synchronously with a rotation angle of the magnetic disk, the second specifying value being a value in which the separation distances at a start point and an end point of one rotation of the magnetic disk coincide;
calculating a target position obtained by subtracting the second specifying value from the first specifying value, the first specifying value specifying a radial position of a specific track over the magnetic disk, the second specifying value displacing a circular concentric circle-shaped path to the path shaped in the closed curve, the circular concentric circle-shaped path having the separation distance as a radius, the separation distance being a distance between the first specifying value and the rotation center;
detecting, based on the servo information read from the magnetic disk with the head, the radial position of the head over the magnetic disk; and
positioning the head based on the radial position of the head.

12. The method according to claim 11, wherein the second specifying value specifies a sinusoidal wave.

13. The method according to claim 11, wherein the second specifying value specifies a triangular wave.

14. The method according to claim 11, wherein the second specifying value specifies a low-order component of a triangular wave.

15. The method according to claim 11, further comprising:
storing the first specifying value and the second specifying value that are associated with each other, or storing the first specifying value and a parameter involved in creating the second specifying value that are associated with each other; and
calculating the target position based on the stored first specifying value and the second specifying value, or based on the stored first specifying value and a parameter in association with the first specifying value.

* * * * *